United States Patent
Abe et al.

(10) Patent No.: US 9,592,554 B2
(45) Date of Patent: Mar. 14, 2017

(54) METHOD FOR MANUFACTURING THREE-DIMENSIONAL SHAPED OBJECT

(75) Inventors: Satoshi Abe, Osaka (JP); Isamu Matsumoto, Osaka (JP); Masataka Takenami, Osaka (JP); Isao Fuwa, Osaka (JP); Yoshikazu Higashi, Shiga (JP); Yoshiyuki Uchinono, Osaka (JP); Norio Yoshida, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 55 days.

(21) Appl. No.: 14/119,224

(22) PCT Filed: May 22, 2012

(86) PCT No.: PCT/JP2012/003342
§ 371 (c)(1),
(2), (4) Date: Nov. 21, 2013

(87) PCT Pub. No.: WO2012/160811
PCT Pub. Date: Nov. 29, 2012

(65) Prior Publication Data
US 2014/0147328 A1 May 29, 2014

(30) Foreign Application Priority Data
May 23, 2011 (JP) .................... 2011-114985

(51) Int. Cl.
*B22F 3/24* (2006.01)
*B22F 3/105* (2006.01)
(Continued)

(52) U.S. Cl.
CPC .............. *B22F 3/24* (2013.01); *B22F 3/1055* (2013.01); *B29C 67/0077* (2013.01);
(Continued)

(58) Field of Classification Search
CPC .... B22F 3/24; B22F 3/1055; B22F 2003/247; B29C 67/0077; B29L 2031/085
(Continued)

(56) References Cited

U.S. PATENT DOCUMENTS

| 4,863,538 A | 9/1989 | Deckard |
| 7,172,724 B2 * | 2/2007 | Abe et al. .......... 419/6 |

(Continued)

FOREIGN PATENT DOCUMENTS

| JP | 1-502890 | 10/1989 |
| JP | 2000-073108 | 3/2000 |

(Continued)

OTHER PUBLICATIONS

Mumtaz et al., "Selective Laser Melting of thin wall parts using pulse shaping," J. of Materials Processing Technology, 210 (2010) pp. 279-287).*

(Continued)

*Primary Examiner* — Jessee Roe
*Assistant Examiner* — John Hevey
(74) *Attorney, Agent, or Firm* — Greenblum & Bernstein, P.L.C.

(57) ABSTRACT

A method for manufacturing a three-dimensional shaped object, comprising: (i) forming a powder layer on a base plate by a sliding movement of a squeegee blade, followed by forming a solidified layer by irradiating a predetermined portion of the powder layer with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, steps (i) and (ii) being repeatedly performed,
wherein machining is performed at least once on an outer surface of a shaped object precursor obtained during manufacturing, and after machining, at least one solidified layer is formed, and followed by upper face
(Continued)

machining to remove a raised solidified portion generated at a peripheral edge of the solidified layer.

4 Claims, 15 Drawing Sheets

(51) Int. Cl.
*B29C 67/00* (2006.01)
*B29L 31/08* (2006.01)

(52) U.S. Cl.
CPC ... *B22F 2003/247* (2013.01); *B29L 2031/085* (2013.01); *Y02P 10/295* (2015.11); *Y02P 70/523* (2015.11)

(58) Field of Classification Search
USPC .......................................... 419/28; 264/497
See application file for complete search history.

(56) References Cited

U.S. PATENT DOCUMENTS

| | | | |
|---|---|---|---|
| 7,754,135 B2* | 7/2010 | Abe et al. | 264/408 |
| 2006/0208396 A1 | 9/2006 | Abe et al. | |
| 2007/0003427 A1* | 1/2007 | Yamamoto et al. | 419/66 |
| 2011/0109016 A1 | 5/2011 | Fuwa et al. | |
| 2012/0308781 A1 | 12/2012 | Abe et al. | |

FOREIGN PATENT DOCUMENTS

| | | |
|---|---|---|
| JP | 2004-277881 | 10/2004 |
| JP | 2005-335203 | 12/2005 |
| JP | 2007-204828 | 8/2007 |
| JP | 2009-279928 | 12/2009 |
| JP | 2011-026675 | 2/2011 |
| WO | 88/02677 | 4/1988 |
| WO | WO 2009/131103 | * 10/2009 |
| WO | 2011/102382 | 8/2011 |

OTHER PUBLICATIONS

Yasa et al., "Investigation on occurrence of elevated edges in selective laser melting," SFF Symposium, Aug. 2009, pp. 180-192.*
Search report from International Search Report in PCT/JP2012/003342 with English language translation, mail date is Jul. 31, 2012.
English language translation of International Preliminary Report on Patentability and Written Opinion with Japanese language original, mail date is Dec. 5, 2013.

* cited by examiner (a)

(b)

(a)

(b)

(a)

Upper face machining locally performed only on a contour region (b)

Upper face machining performed on an entire upper surface

Machined portion

Unmachined portion

METHOD FOR MANUFACTURING THREE-DIMENSIONAL SHAPED OBJECT

TECHNICAL FIELD

The present invention relates to a method for manufacturing a three-dimensional shaped object. More particularly, the present invention relates to a method for manufacturing a three-dimensional shaped object with a plurality of solidified layers stacked integrally by repeating the step of forming a solidified layer by irradiating a predetermined portion of a powder layer with a light beam.

BACKGROUND OF THE INVENTION

Heretofore, a method for manufacturing a three-dimensional shaped object by irradiating a powder with a light beam has been known (such method can be generally referred to as "selective laser sintering method"). Such method can produce the three-dimensional shaped object with a plurality of solidified layers stacked integrally by repeating the step (i) of forming a solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated contour shape in a short period of time.

The selective laser sintering method is described in detail, taking a case of the three-dimensional shaped object being manufactured on a supporting part as an example. As shown in FIG. 1, a powder layer 22 with a predetermined thickness t1 is firstly formed on a base plate for shaped object 21 (see FIG. 1(a)) and then a predetermined portion of a powder layer 22 is irradiated with a light beam to form a solidified layer 24. Then, a powder layer 22 is newly provided on the solidified layer 24 thus formed and is irradiated again with the light beam to form another solidified layer. When the formation of the solidified layer is repeatedly performed, there can be obtained the three-dimensional shaped object with a plurality of solidified layers 24 stacked integrally (see FIG. 1(b)). Since the solidified layer located lowermost may be formed to be attached with the base plate for shaped object, the obtained three-dimensional shaped object and the base plate are integrated each other. The integrated products of three-dimensional shaped object and the base plate can be used as a mold in as-obtained.

PATENT DOCUMENTS

Conventional Art Documents

PATENT DOCUMENT 1: JP-T-01-502890
PATENT DOCUMENT 2: JP-A-2000-73108
PATENT DOCUMENT 3: JP-A-2004-277881

DISCLOSURE OF THE INVENTION

Problems to be Solved by the Invention

The inventors of the present application have found that in the selective laser sintering method, as shown in FIG. 13, the direct irradiation of a portion not containing a base material with a laser light allows powder surrounding the portion to be largely melted, which results in formation of a raised portion due to its surface tension. That is, when the laser light is directly applied to a region without having a solidified part as the base material, the powder surrounding the region is largely melted, resulting in the raised solidified portion (hereinafter referred to as a "raised end") at the peripheral edge or contour of the solidified layer. In supplying powder for formation of a next layer, a squeegee blade might collide with such a raised solidified portion, which makes it impossible to form a desired powder layer.

The present invention has been made in view of the foregoing circumstances. That is, it is an object of the present invention to provide a "method for manufacturing a three-dimensional shaped object" appropriate for the formation of a powder layer using a squeegee blade.

Means for Solving the Problems

In order to solve the foregoing problem, the present invention provides a method for manufacturing a three-dimensional shaped object, including the steps of:

(i) forming a powder layer on a base plate by a sliding movement of a squeegee blade, followed by forming a solidified layer by irradiating a predetermined portion of the powder layer with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed, wherein machining is performed at least one time on an outer surface of a shaped object precursor (specifically, side surface of the precursor) obtained during manufacturing the three-dimensional shaped object, and wherein after the machining of the side surface, at least one solidified layer is formed, and then upper face machining (i.e. the top face machining) is performed to remove a raised solidified portion (i.e. "raised end") generated at a peripheral edge (i.e. a contour) of the resulting solidified layer.

In one preferred embodiment, the upper face machining is performed on only the peripheral edge of the solidified layer. That is, the upper face machining ("top face machining") is performed on only a contour region of the upper surface of the "solidified layer formed after the machining of the side surface".

In another preferred embodiment, the upper face machining is performed on the entire top surface of the "solidified layer formed after the machining of the side surface". That is, the "upper face machining for removing the raised solidified portion" is performed on the entire "upper surface of the solidified layer after the machining of the side surface" including the peripheral edge of the solidified layer.

In performing the upper face machining on the entire upper surface of the "solidified layer formed after the machining of the side surface", a "cutting tool used for the upper face machining" is moved not only to the solidified region of interest for the upper face machining, but also up to a region covering a powder region surrounding the solidified region" thereby performing the upper face machining for removing the raised solidified portion.

When the solidified layer of interest for the upper face machining is formed of a plurality of sub-solidified regions, the upper face machining may be performed by moving the cutting tool not only to the sub-solidified regions, but also to the region covering the powder region surrounding the sub-solidified regions. In such a case, the region of interest for the upper face machining is defined by a "group of at least two sub-solidified regions", and the upper face machining may be performed in units of groups. For example, the cutting tool is moved not only to the sub-solidified regions included in the group, but also up to the region covering the powder region surrounding each solidified region, so that the upper face machining may be performed in units of groups.

When the solidified region of interest for the upper face machining is formed of a plurality of sub-solidified regions, the optimal upper face machining is preferably selected according to the forms of the sub-solidified region of interest, the control specifications and operation forms of the cutting tool corresponding to the sub-solidified region, and the like. Specifically, the method of the invention involves determining a "machining time A for locally performing the upper face machining only on the peripheral edge of each sub-solidified region", and a "machining time B for entirely performing the upper face machining by moving the cutting tool not only to the peripheral edge of each sub-solidified region, but also to other upper surface regions" (that is, entire upper surface and/or powder region of the solidified region). Then, the upper face machining having the shortest machining time of the measured machining times is selected, and performed.

In another embodiment, the thickness of the raised solidified portion generated at the peripheral edge of the "solidified layer formed after the machining of the side surface" (size of the raised solidified portion in the vertical direction) might become large enough to interrupt the sliding movement of the squeegee blade. In the invention, the upper face machining is particularly preferably performed to remove the raised solidified portion which might interrupt the sliding movement of the squeegee blade. In such a case, the thickness of the raised solidified portion is measured. When the measured thickness of the raised portion is large enough to interrupt the sliding movement of the squeegee blade, the upper face machining may be performed.

In another embodiment, every time one solidified layer is formed after the machining of the outer surface (side surface) of the shaped object precursor, the upper face machining is performed on the raised solidified portion.

Effect of Invention

In the manufacturing method of the invention, even when the solidified portion vertically raised is generated in the peripheral edge of the solidified layer as shown in FIG. 13, the upper face machining reduces the height of the raised solidified portion (i.e. the size in the thickness direction or the size in the vertical direction), which can prevent the interruption of the sliding movement of the squeegee blade.

In the invention, when the size of the raised solidified portion becomes large enough to interrupt the sliding movement of the squeegee blade, the upper face machining may be performed at that time. However, for example, when the "upper face machining" is to be performed every time one solidified layer is formed after the machining of the side surface, the shaped object can be appropriately manufactured regardless of the size of the raised solidified portion (degree of progress of the raising state). That is, in such a case, the shaped object can be appropriately manufactured without monitoring the size of the raised solidified portion.

BRIEF DESCRIPTION OF THE DRAWINGS

FIGS. 8(a) and 8(b) are schematic diagrams showing the forms of "upper face machining", in which FIG. 8(a) shows the form of the upper face machining performed only on a peripheral edge of a solidified layer, and FIG. 8 (b) shows the form of the upper face machining performed on the entire upper surface of the solidified layer of interest.

FIGS. 11(a) to 11(d) are schematic diagrams showing the respective forms of the "upper face machining for removing the raised solidified portion" when the solidified layer of interest for the upper face machining is formed of a plurality of sub-solidified regions, in which FIG. 11(a) shows the upper face machining performed only the peripheral edge of each sub-solidified region, FIG. 11(b) shows the upper face machining performed on the entire upper surface of each sub-solidified region, FIG. 11(c) shows the upper face machining performed not only the entire upper surface of each sub-solidified region but also the region covering the powder region surrounding the sub-solidified region, and FIG. 11(d) shows the upper face machining performed every group region.

MODES FOR CARRYING OUT THE INVENTION

The present invention will be hereinafter described in more detail with reference to the accompanying drawings.

As used in this description and claims, the term "powder layer" substantially means "metal powder layer made of a metal powder", for example. Also, the term "predetermined portion of a powder layer" substantially means a portion of a three-dimensional shaped object to be manufactured. Therefore, a powder existing in such predetermined portion is irradiated with a light beam, whereby the powder undergoes a sintering or a melting and subsequent solidification thereof to form a shape of the three-dimensional shaped object. Furthermore, the term "solidified layer" substantially means "sintered layer" in a case where the powder layer is a metal powder layer, and substantially means "hardened layer" in a case where the powder layer is a resin powder layer.

Although this is just one example, the metal powder used in the present invention may be a powder containing an iron based powder as a main component, and may be a powder which further contains at least one kind powder selected from the group consisting of a nickel powder, a nickel based alloy powder, a copper powder, a copper based alloy powder and a graphite powder. Examples of the metal powder include a metal powder in which the proportion of an iron based powder having a mean particle diameter of about 20 μm is 60 to 90% by weight, the proportion of both or either of a nickel powder and a nickel based alloy powder is 5 to 35% by weight, the proportion of both or either of a copper powder and/or a copper based alloy powder is 5 to 15% by weight, and the proportion of a graphite powder is 0.2 to 0.8% by weight.

[Selective Laser Sintering Method]

Figure 1:
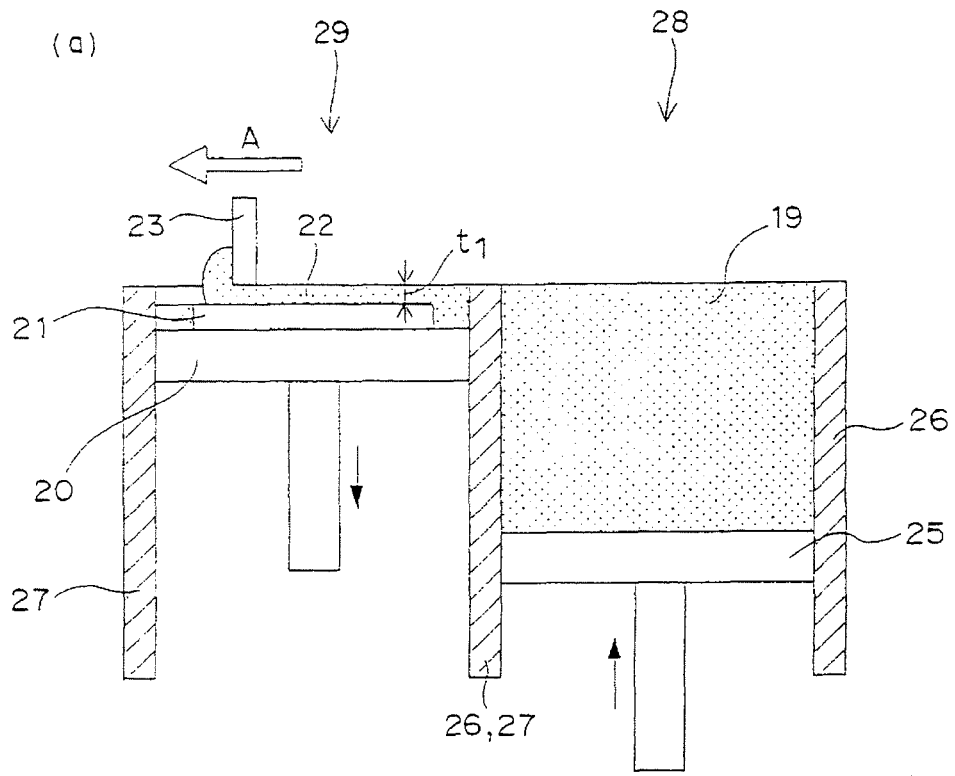
FIGS. 1(a) and 1(b) are sectional views schematically showing operations of a laser-sintering/machining hybrid machine.
Figure 1:
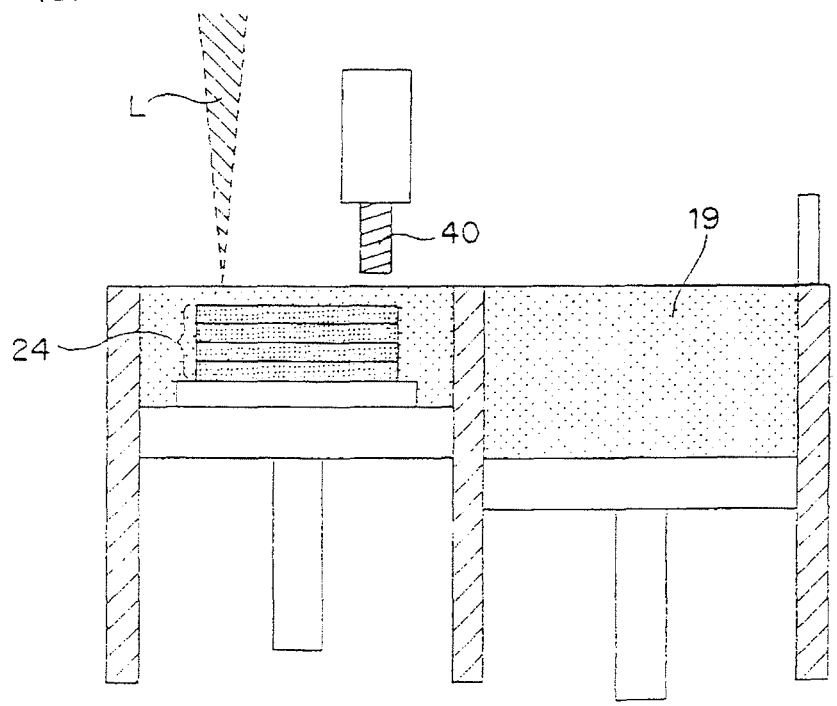
Figure 2:
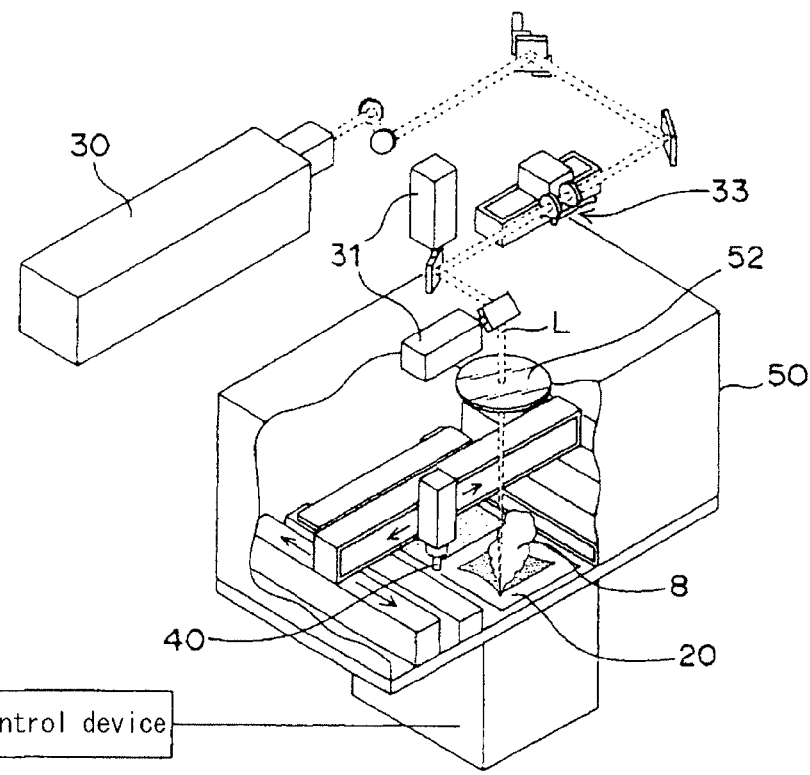
FIGS. 2(a) and 2(b) are perspective views schematically illustrating a device for performing a laser sintering (i.e., selective laser sintering method) wherein FIG. 2(a) especially shows a hybrid device with a machining mechanism, and FIG. 2(b) especially shows a device with no machining mechanism.
Figure 2:
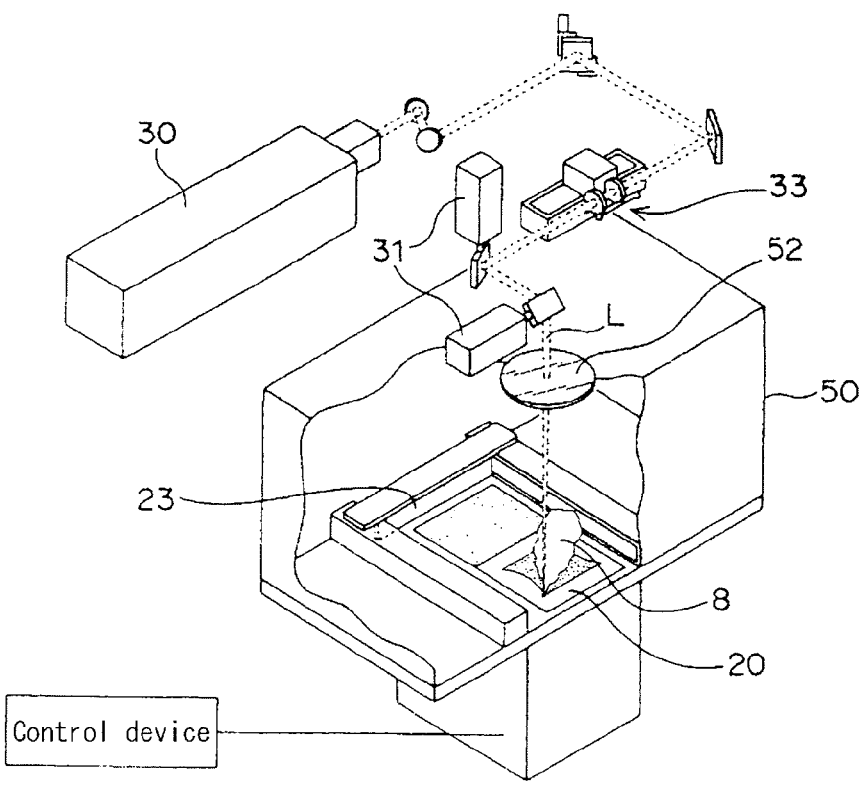
Figure 3:
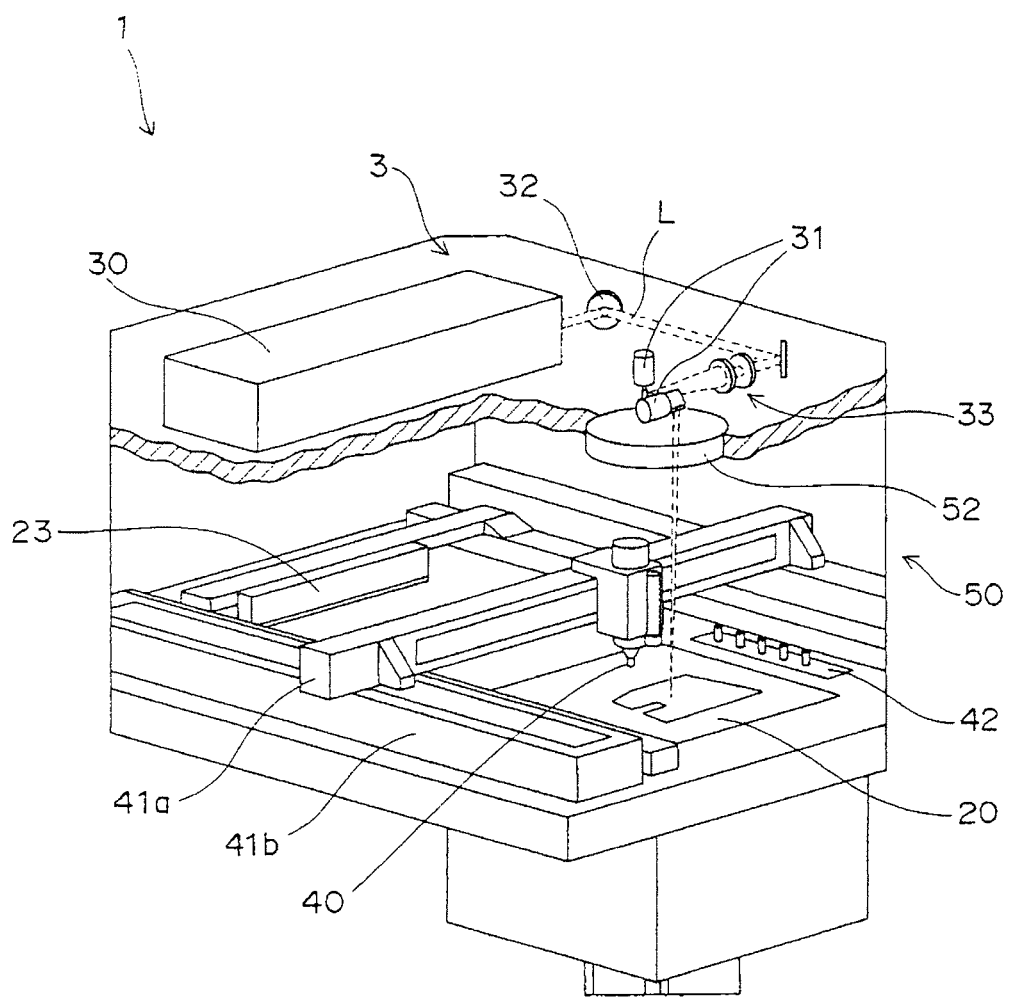
FIG. 3 is a perspective view schematically showing an embodiment in which a selective laser sintering method is carried out.
Figure 4:
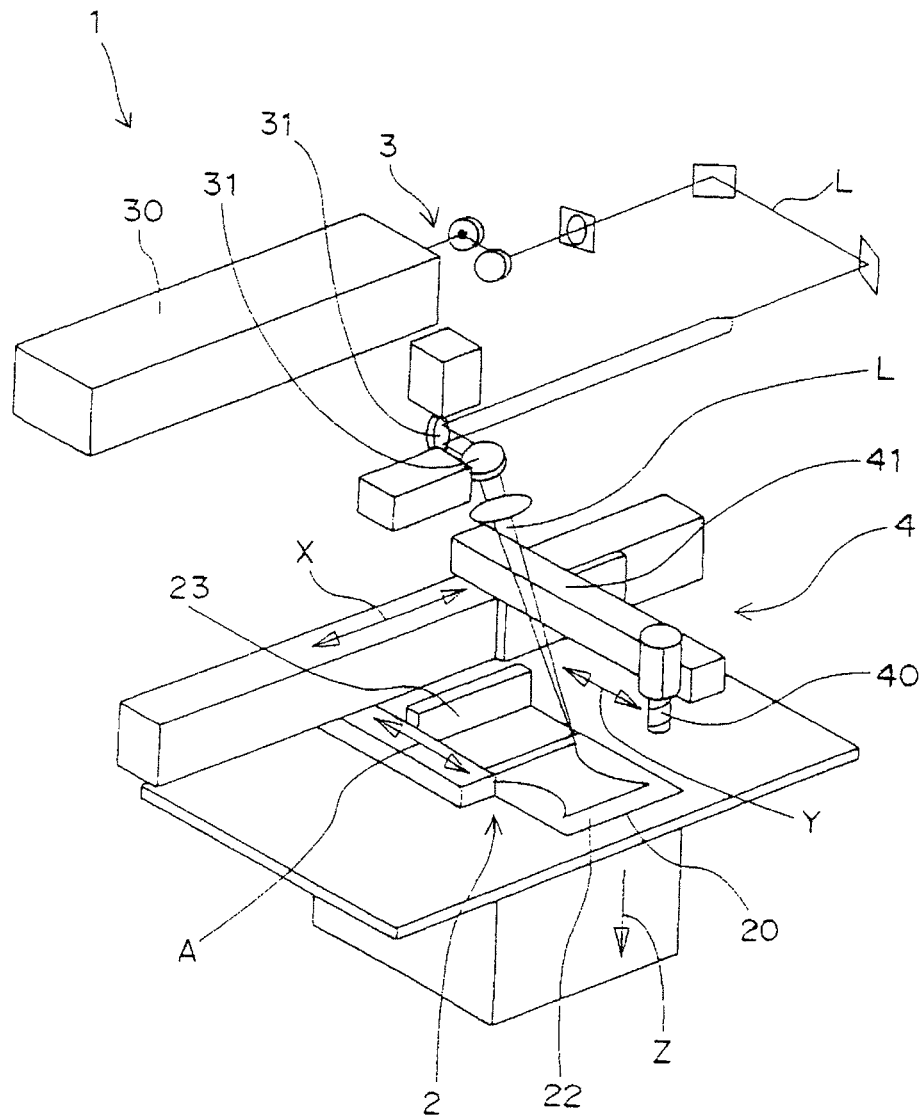
FIG. 4 is a perspective view schematically showing a constitution of a laser-sintering/machining hybrid machine by which a selective laser sintering method is carried out.

First, a selective laser sintering method, on which the manufacturing method of the present invention is based, will be described. For convenience, the selective laser sintering method, which will be described, is one where powder material is supplied from a storage tank therefor, followed by being flattened by means of a squeegee blade to form a powder layer therefrom. Moreover, by way of example, the selective laser sintering method wherein a machining is additionally carried out with respect to the shaped object (i.e., the method embodiment shown in FIG. 2(a), not FIG. 2(b)) will be described. FIGS. 1, 3 and 4 show functions and constitutions of a laser-sintering/machining hybrid machine, which enables execution of the selective laser sintering method. The laser-sintering/machining hybrid machine 1 is mainly provided with a "powder layer forming means 2 for forming a powder layer by providing a powder such as a metal powder or a resin powder in a predetermined thickness"; a "forming table 20 which is capable of vertically elevating/descending in a forming tank 29 whose outer periphery is surrounded with a wall 27"; a "base plate for shaped object 21 which is disposed on the forming table 20 and serves as a platform of a shaped object"; a "light-beam irradiation means 3 for irradiating a desired position with an emitted light beam L"; and a "machining means 4 for milling the periphery of a shaped object". As shown in FIG. 1, the powder layer forming means 2 is mainly composed of a "powder table 25 capable of vertically elevating/descending in a storage tank for powder material 28 whose outer periphery is surrounded with a wall 26" and a "squeegee blade 23 for forming a powder layer 22 on a base plate for shaped object". As shown in FIG. 3 and FIG. 4, the light-beam irradiation means 3 is mainly composed of a "light beam generator 30 for emitting a light beam L" and a "galvanometer mirror 31 (scan optical system) for scanning a light beam L onto a powder layer 22". Optionally, the light-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the periphery of a shaped object" and an "X-Y actuator 41 (41a, 41b) for driving the milling head 40 to move toward the position to be milled (see FIG. 3 and FIG. 4).

Figure 5:
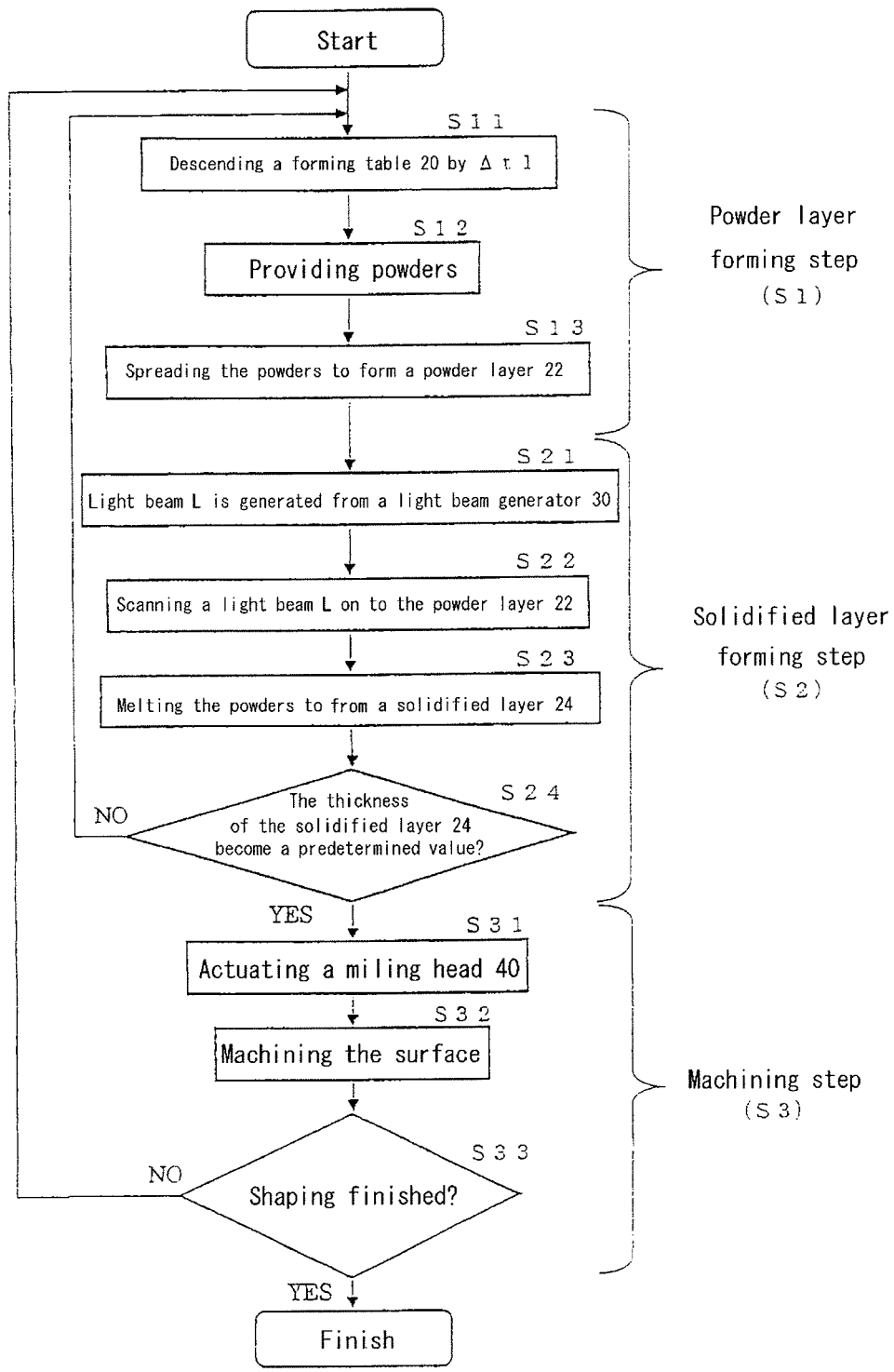
FIG. 5 is a flow chart of operations of a laser-sintering/machining hybrid machine.
Figure 6:
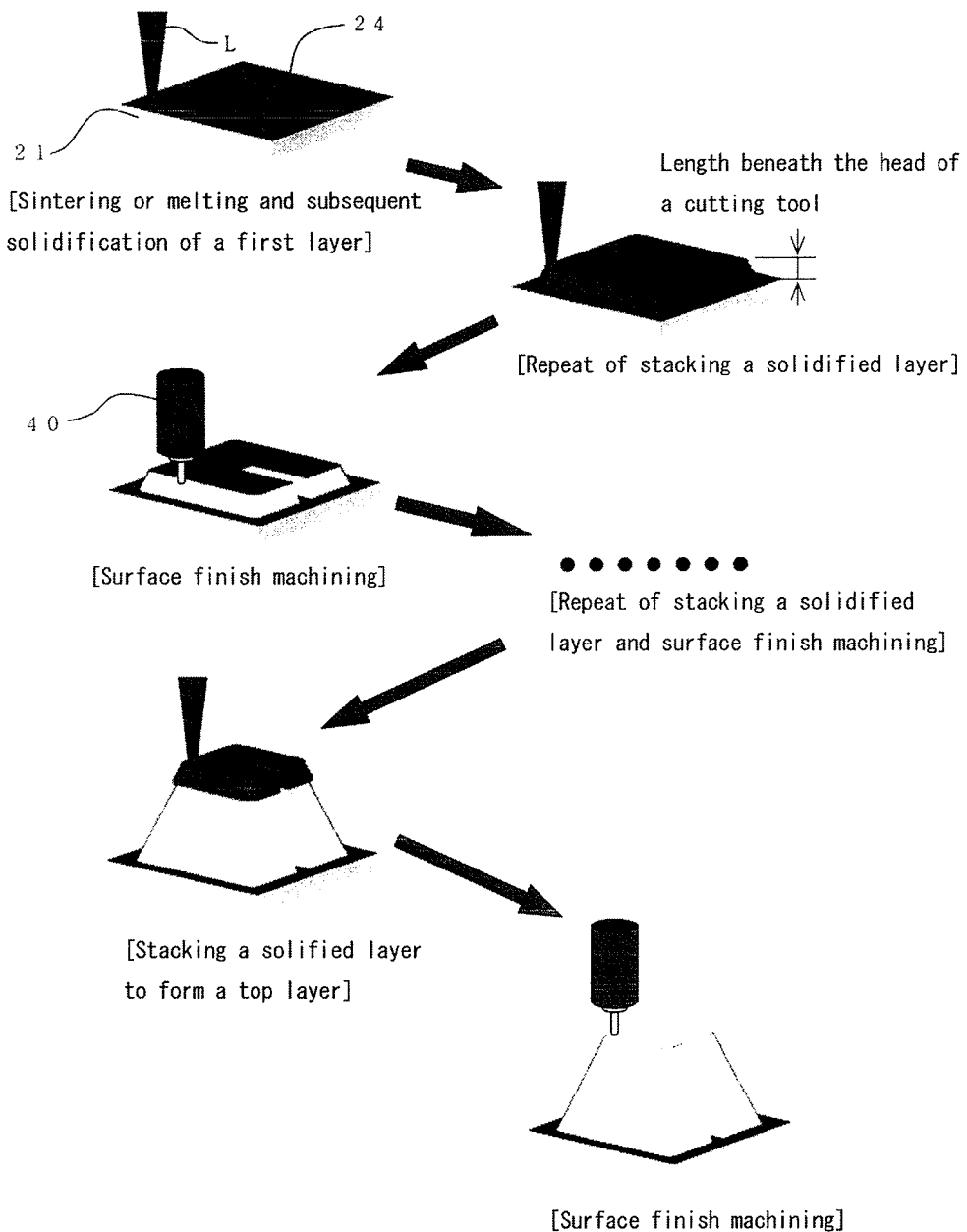
FIG. 6 is a schematic view showing a laser-sintering/machining hybrid process over time.

Operations of the laser-sintering/machining hybrid machine 1 will be described in detail with reference to FIG. 1, FIG. 5 and FIG. 6. FIG. 5 shows a general operation flow of a laser-sintering/machining hybrid machine. FIG. 6 schematically and simply shows a laser-sintering/machining hybrid process.

The operations of the laser-sintering/machining hybrid machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by Δt1 (S11). Subsequently, a powder table 25 is elevated by Δt1, and thereafter the squeegee blade 23 is driven to move in the direction of arrow "A" as shown in FIG. 1(a). Whereby, powders (e.g., an "iron powder having a mean particle diameter of about 5 μm to 100 μm" or a "powder having a mean particle diameter of about 30 μm to 100 μm, such as a powder of nylon, polypropylene or ABS") placed on the powder table 25 is spread to form a powder layer 22 in a predetermined thickness Δt1 (S13), while being transferred onto the base plate 21 (S12). Following this step, the solidified layer forming step (S2) is performed. In this the solidified layer forming step, a light beam L (e.g., carbon dioxide gas laser (500 W), Nd:YAG laser (500 W), fiber laser (500 W) or ultraviolet light) is emitted from the light beam generator 30 (S21) and then a light beam L is scanned onto a desired position of the powder layer 22 by means of the galvanometer mirror 31 (S22). The scanned light beam can cause the powder to be melted and solidified, resulting in a formation of the solidified layer 24 integrated with the base plate 21 (S23). There is not limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is obtained based on a tool length of the milling head 40 (see FIG. 1(b)). Upon a sintering of the powder or a melting and subsequent solidification of the powder, the newly stacked solidified layer is integrated with the lower solidified layer which has already been formed.

When the thickness of the stacked solidified layers 24 reaches a predetermined thickness, the machining step (S3) is initiated. In the embodiments as shown in FIG. 1 and FIG. 6, the milling head 40 is actuated to initiate execution of the machining step (S31). For example, in a case where the tool (ball end mill) of the milling head 40 has a diameter of 1 mm and an effective milling length of 3 mm, a milling in a depth of 3 mm can be performed. Therefore, when Δt1 is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1). Thereafter, the steps S1 through S3 are repeatedly performed to further stack the solidified layers 24, and thereby making it possible to manufacture the desired three-dimensional shaped object (see FIG. 6).

An irradiation path of the light beam L in the solidified layer forming step (S2) and a milling path in the machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when Δt1 is 0.05 mm) sliced sections of STL data produced from a 3-D CAD model, are used.

[Manufacturing Method of the Invention]

Figure 7:
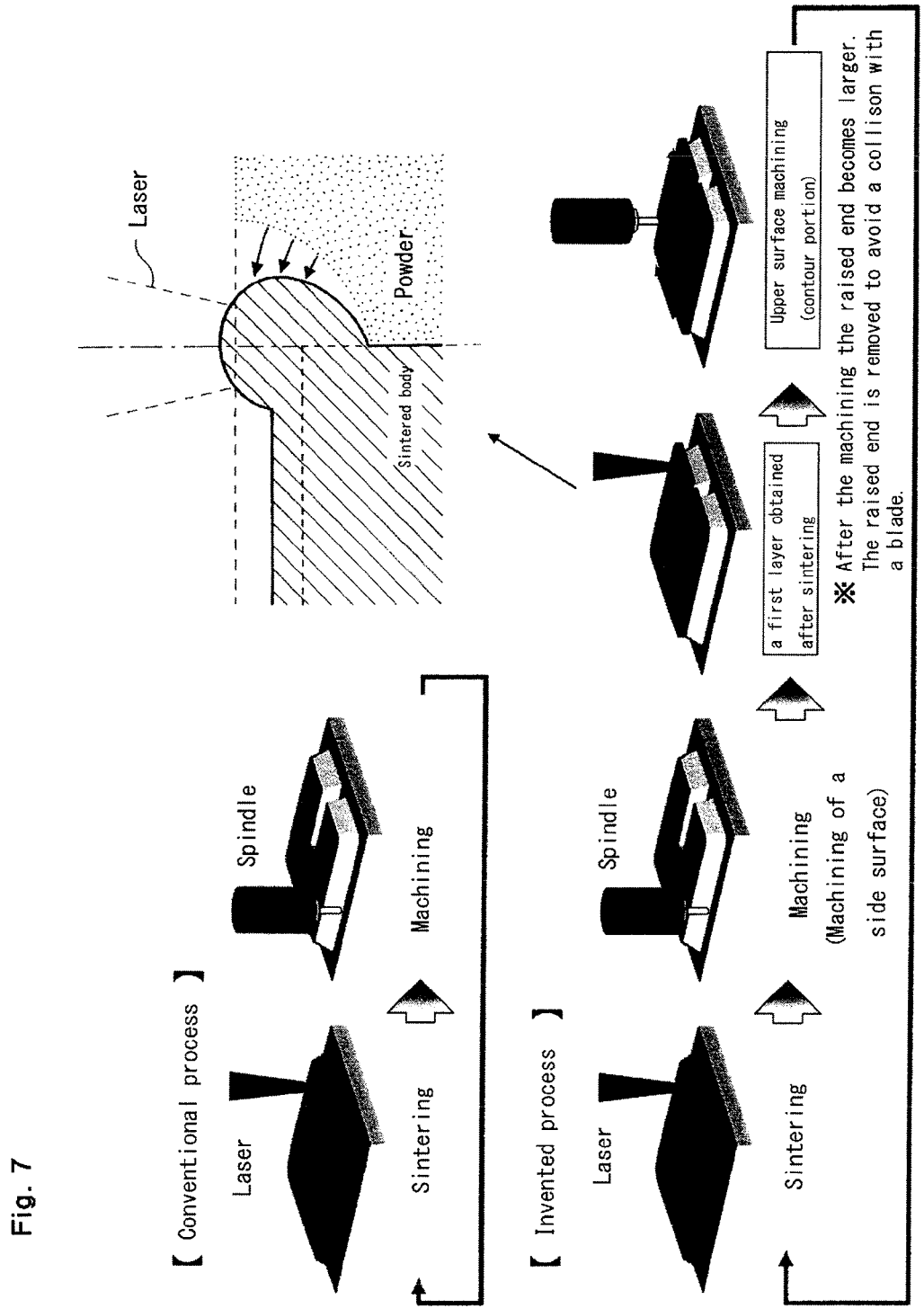
FIG. 7 is a schematic diagram showing the features of a manufacturing process of the invention as compared to a conventional process.

One of the features of the invention in the above selective laser sintering method is the formation process of the solidified layer together with the machining process. Specifically, the method of the invention involves removing the "raised end" generated in sintering (undercutting) of the first layer after the machining of the side surface. More specifically, as shown in FIG. 7, after machining the side surface of a shaped object precursor, the solidified layer obtained by sintering at least one layer has its upper surface (particularly, an upper portion of its peripheral edge) machined or cut.

In other words, in the invention, the machining is performed at least one time on an outer side surface of the shaped object precursor produced during the manufacturing process. After machining the outer side surface, at least one solidified layer is formed. The resulting solidified layer undergoes the upper face machining to remove at least a part of the raised end (i.e. raised solidified portion) generated at the peripheral edge (i.e. contour) of the solidified layer (see FIG. 7).

Figure 13:
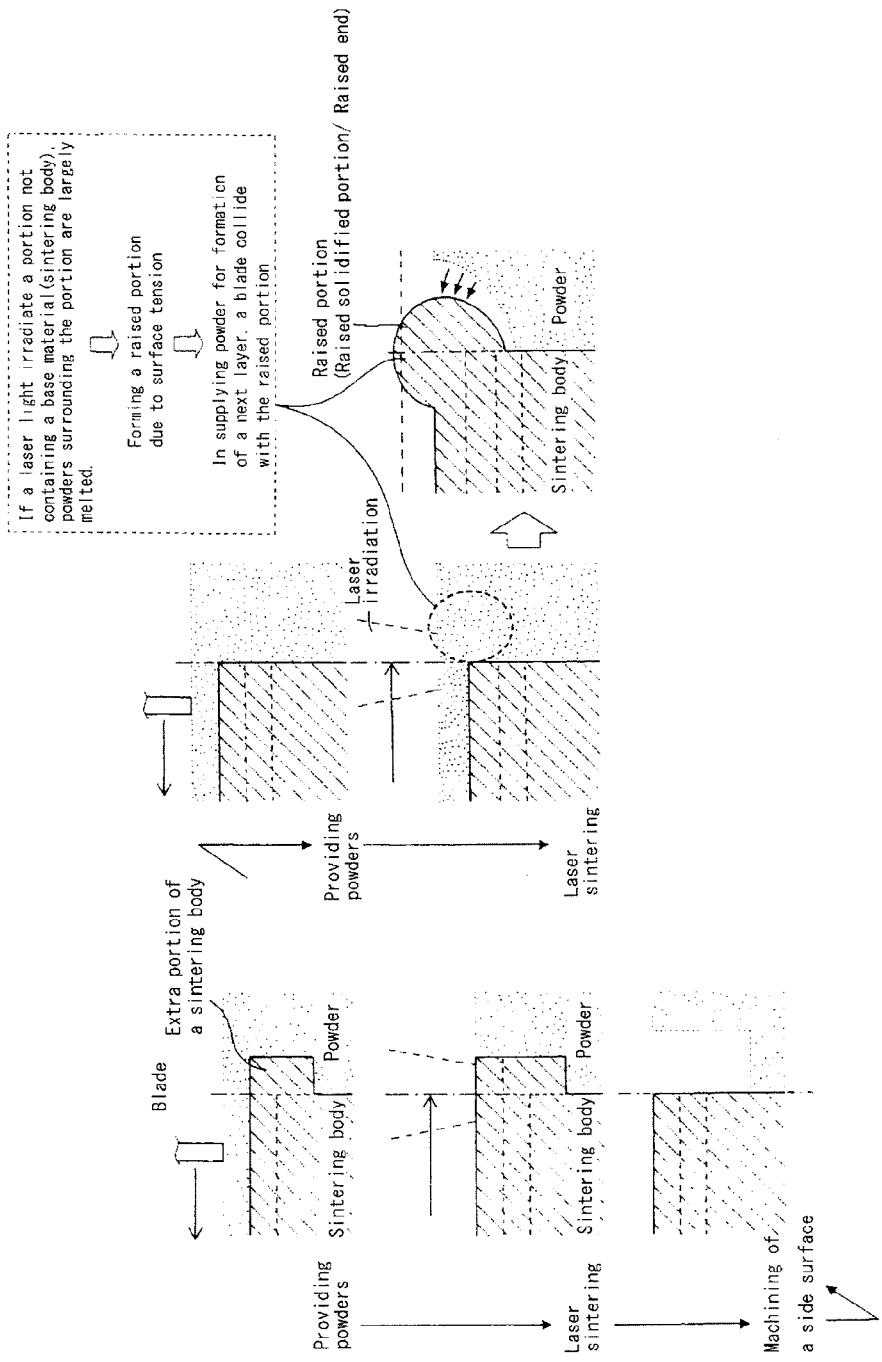
FIG. 13 is a schematic diagram showing the phenomenon of the "raised solidified portion" changed over time.

The "raised end" is one generated in the peripheral edge of the solidified layer formed after the "machining on the outer surface of the shaped object". In short, the "raised solidified portion" as used in the invention substantially means a local solidified portion generated in formation of the solidified layer after machining the side surface, specifically a local solidified portion generated in a contour region of the solidified layer to have a thickness extending vertically (see FIG. 13).

The thickness (size in a vertical direction) of such a raised solidified portion sometimes becomes large enough to interrupt the sliding movement of the squeegee blade. Specifically, as the number of stacked solidified layers formed after the machining is increased (that is, as the further formation of another solidified layer proceeds after the machining of the side surface), the thickness of the raised solidified portion is gradually increased. Thus, the invention prevents interruption of the sliding movement of the squeegee blade by appropriately performing the "upper face machining process".

The "upper face machining" as used in the invention means the machining performed on the top surface of the shaped object precursor obtained during the manufacturing process. Thus, the "upper face machining" is different from the "side surface machining" for performing machining on the side surface of the shaped object precursor.

Figure 8:
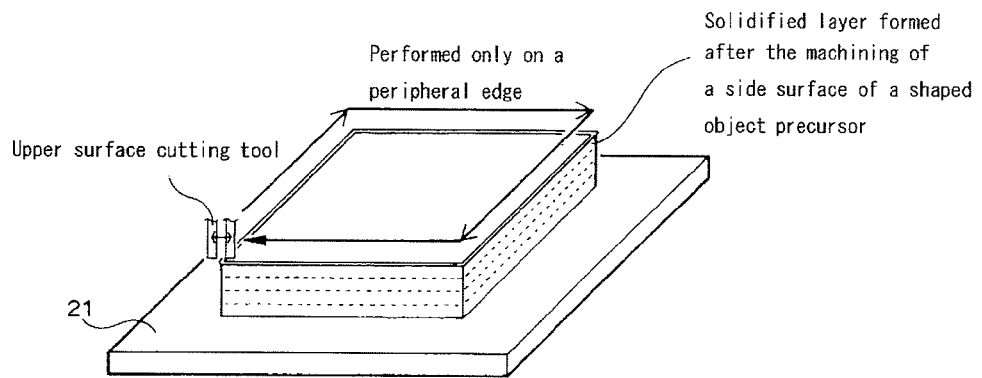
Figure 8:
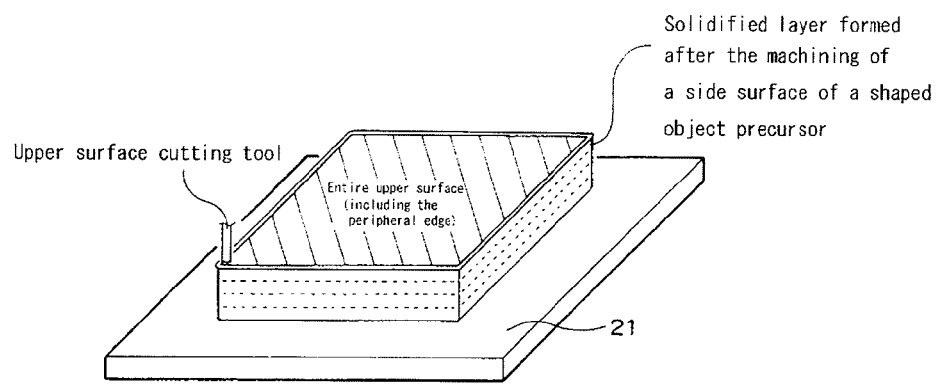

Preferably, in the invention, the upper face machining is performed only on the peripheral edge of the solidified layer. That is, the top face machining is locally performed only on the contour region of the solidified layer formed after the machining of the side surface (see FIG. 8 (*a*)). In this way, the raised solidified portion can be effectively removed. The "peripheral edge" as used in the invention indicates a contour portion of an upper surface of the solidified layer with the "raised solidified portion" (i.e. "raised end") formed thereat (that is, the solidified layer obtained after sintering at least one layer after the machining of the side surface of the shaped object precursor) (which indicates a local region from an outermost side surface of the solidified layer toward the inside thereof within a range of about 9 mm from the outermost side surface, for example, within a range of about 5 mm, particularly, about 2 mm, by way of example).

In the invention, at least the upper face machining is performed to remove the raised solidified portion, i.e., raised end. However, the invention is not limited to the upper face machining performed on only the peripheral edge of the solidified layer, and the "upper face machining" may be performed on the entire upper surface (top surface) of the solidified layer of interest. That is, the "upper face machining for removing the raised solidified portion" may be performed on the entire "upper surface of the solidified layer obtained after the machining of the side surface" including the peripheral edge of the solidified layer (see FIG. 8(*b*)). Specifically, the cutting tool may be moved not only to the "peripheral edge region of the solidified layer with the raised solidified portion formed therein", but also up to a solidified layer region located inside the edge region, thereby performing the "upper face machining for removing the raised solidified portion". Thus, the cutting tool for performing the upper face machining can be easily controlled, or the control of movement of the cutting tool is made relatively simple, which can reduce the total time for the upper face machining.

The cutting tool for use in the upper face machining is not specifically limited, and may be any cutting tool as long as it serves to remove the "raised solidified portion". For example, an end mill (for example, a square end mill) may be used for the "upper face machining". In use of the end mill, its diameter is preferably larger than a spot diameter of the light beam. When performing the "upper face machining" on the entire upper surface (top surface) of the solidified layer of interest, for example, a rotary cutter may be used, or a squeegee blade with a blade portion may be used.

Figure 9:
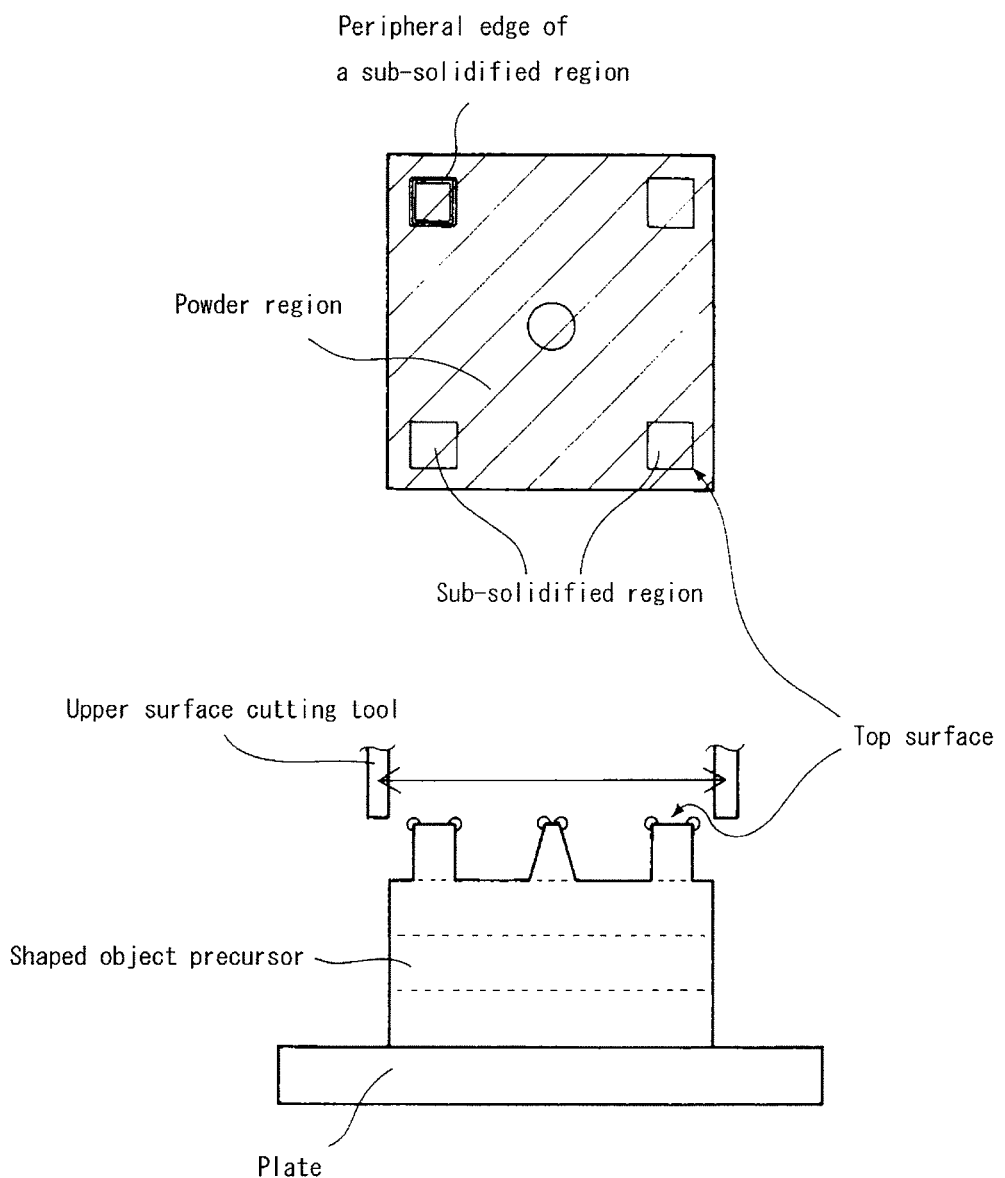
FIG. 9 is a schematic diagram showing the form of the upper face machining performed by moving the cutting tool through not only sub-solidified regions, but also a region covering a powder region surrounding each sub-solidified region.

When performing the upper face machining on the entire "upper surface of the solidified layer after the machining" of the side surface, the cutting tool for the upper surface may be moved not only to the solidified region of interest for the upper face machining, but also up to the region covering the powder region surrounding the solidified region, so that the upper machining may be performed to remove the raised solidified portion. For this reason, the cutting tool for the upper face machining can be easily controlled, or the control of movement of the cutting tool is made relatively simple, which can reduce the total time for the upper face machining. The solidified layer of interest for the upper face machining is assumed to be formed of a plurality of sub-solidified regions (for example, when using the three-dimensional shaped object as a metal mold, a plurality of solidified layers of interest for the upper face machining are formed depending on the shape of a cavity surface of the metal mold). In this case, the upper face machining may be performed by moving the cutting tool not only to the sub-solidified regions, but also to the region covering the powder region surrounding the sub-solidified regions (see FIG. 9). That is, as shown in FIG. 9, not only the "peripheral edge of each sub-solidified region with the raised solidified portion", but also the sub-solidified region inside the peripheral edge and the powder region outside the peripheral edge are regarded as one entire region, to which the cutting tool may be moved to thereby perform the "upper face machining for removing the raised solidified portion".

Figure 10:
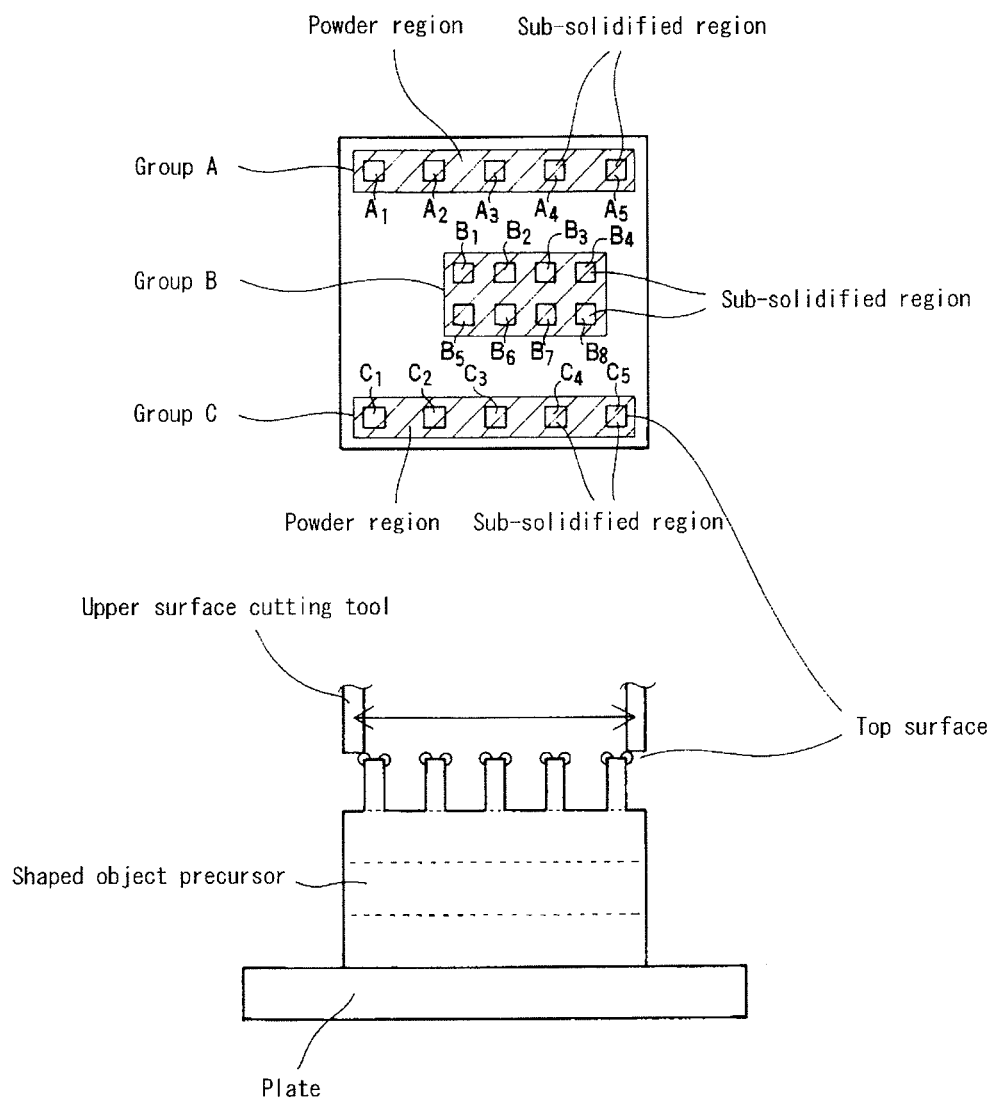
FIG. 10 is a schematic diagram showing the form of the upper face machining process performed on a group basis with defining the "group composed of a plurality of sub-solidified regions".

When the solidified layer of interest for the upper face machining is formed of a plurality of sub-solidified regions, the solidified region of interest for the upper face machining is defined by a "group of at least two sub-solidified regions", and the upper face machining may be performed in units of groups (see FIG. 10). For example, the cutting tool is moved not only to the sub-solidified regions included in the group, but also up to the powder region surrounding each solidified region, so that the upper face machining may be performed in units of groups. This aspect will be described with reference to the form shown in FIG. 10, by way of example. The upper face machining may be individually performed for each of the groups A, B, and C, each including at least two sub-solidified regions. More specifically, in the group A, the "upper face machining for removing the raised solidified portions" is performed by entirely moving the cutting tool through not only the peripheral edges of the sub-solidified regions $A_1$, $A_2$, $A_3$, $A_4$ and $A_5$ forming the group A, but also one region collectively including the sub-solidified regions inside the respective peripheral edges and the powder region outside the edges. In the group B, the "upper face machining for removing the raised solidified portions" is performed by entirely moving the cutting tool through not only the peripheral edges of the sub-solidified regions $B_1$, $B_2$, $B_3$, $B_4$, $B_5$, $B_6$, $B_7$ and $B_8$ forming the group B, but also one region collectively including the sub-solidified regions inside the respective peripheral edges and the powder region outside the edges. In the group C, the "upper face machining for removing the raised solidified portions" is performed by entirely moving the cutting tool through not only the peripheral edges of the sub-solidified regions $C_1$, $C_2$, $C_3$, $C_4$ and $C_5$ forming the group C, but also one region collectively including the sub-solidified regions inside the respective peripheral edges and the powder region outside the edges.

When the solidified layer of interest for the upper face machining is formed of the sub-solidified regions, the "upper face machining for removing the raised solidified portion" can take four forms of machining shown in FIGS. 11(a) to 11(d).

Figure 11:
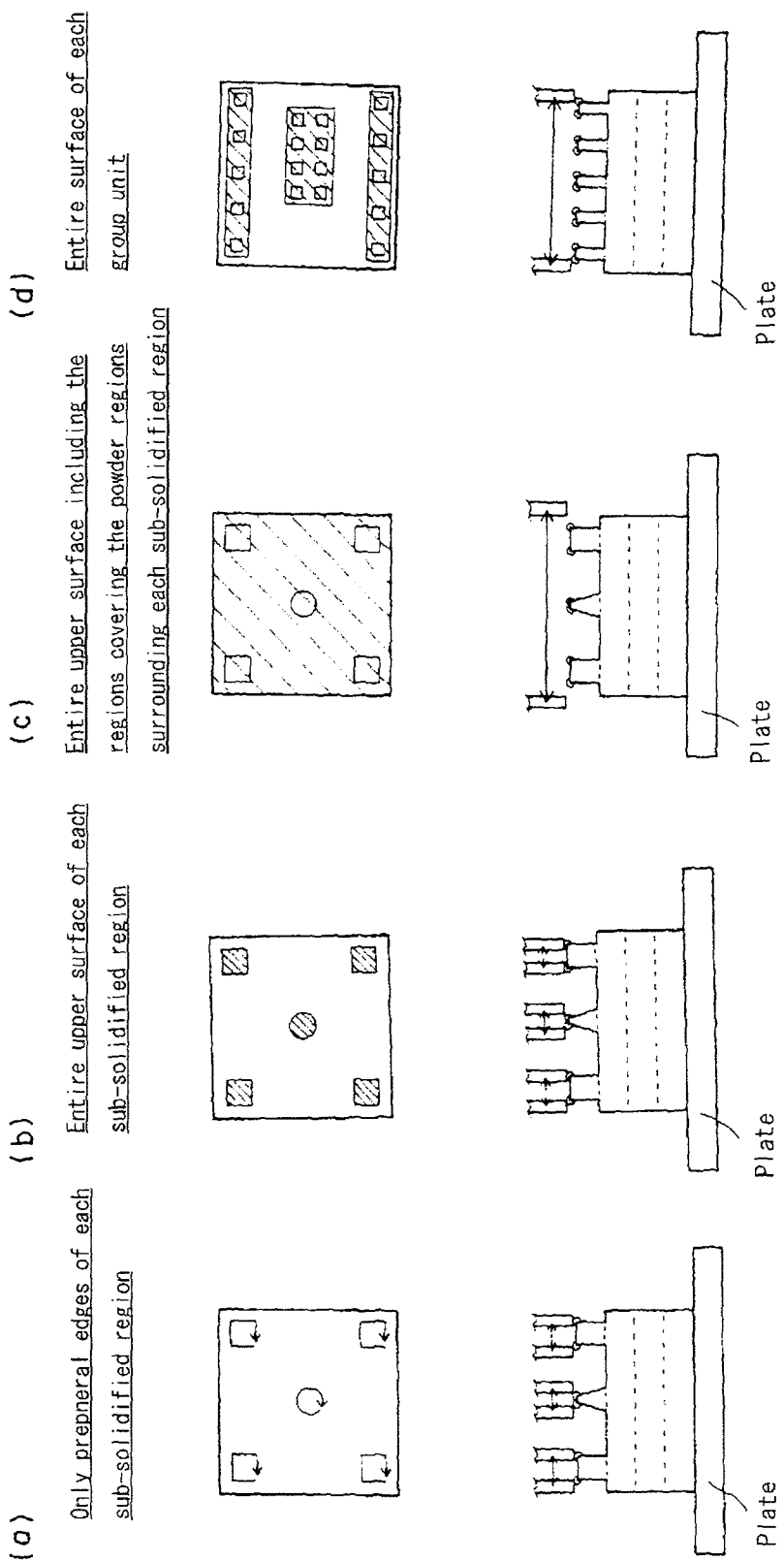

(i) Only the peripheral edges of the respective sub-solidified regions undergo the upper face machining process (see FIG. 11(a)).

(ii) The entire upper surfaces of the respective sub-solidified regions undergo the upper face machining process (see FIG. 11(b)).

(iii) Not only the entire upper surfaces of the respective sub-solidified regions, but also the region covering the powder region surrounding the respective solidified regions entirely undergo the upper face machining process by moving the cutting tool (see FIG. 11(c)).

(iv) A plurality of groups each including at least two sub-solidified regions entirely undergo the upper face machining process in units of groups (see FIG. 11(d)).

As mentioned above, the total time for the upper face machining for removing the raised solidified portions in the sub-solidified regions depends on the form of a control operation of the cutting tool. The inventors of the present application have found that as the number of the sub-solidified regions become larger, the machining speed or rate cannot be increased, which tends to increase the total time for the upper face machining. Thus, in the invention, preferably, each of the above forms (i) to (iv) of the machining processes is performed so as to determine the corresponding time for machining, and the type of the upper face machining having the shortest machining time is selected from among the above forms (i) to (iv) of machining processes. That is, the method of the invention determines a machining time A for locally performing the upper face machining only on the peripheral edge of each sub-solidified region, as well as a machining time B for entirely performing the upper face machining by moving the cutting tool through not only the peripheral edge of each sub-solidified region, but also other upper surface regions (i.e., the entire upper surface and/or powder region of the solidified region). Then, the upper face machining having the shortest machining time of the times A and B is selectively performed. In either case, the optical upper face machining is preferably performed according to the forms of the sub-solidified region of interest, the control specifications and operation forms of the cutting tool corresponding to the sub-solidified region, and the like.

As mentioned above, the "raised solidified portion" generated in the peripheral edge of the solidified layer is one caused by forming at least one solidified layer after the "machining of the side surface of the shaped object". The "upper face machining" may be performed after forming one solidified layer. Alternatively, the "upper face machining" may be performed after performing the "machining of the side surface of the shaped object" and then forming a plurality of solidified layers. Alternatively, every time the solidified layer is formed, the upper face machining may be performed through the plurality of the solidified layers. By way of example, the method may involve: machining→first layer sintering→upper face machining→second layer sintering→upper face machining→ . . . →n-th layer sintering (without upper face machining)→(n+1)-th layer sintering (without upper face machining)→(n+2)-th layer sintering (without upper face machining)→machining (in some cases, the upper face machining may be performed through all layers). When performing the "upper face machining" after formation of a plurality of layers, the raised end is monitored (measured). Once the height of the raised end is higher than that of the squeegee blade, the "upper face machining process" may be performed. That is, when the measured thickness of the raised solidified portion is determined to be large enough to interrupt the sliding movement of the squeegee blade, the upper face machining process may be performed. The "raised solidified portion" may be indirectly monitored by measuring a load on the squeegee blade, or a height of the upper surface (that is, the thickness of the raised solidified portion may be measured by use of a contact or non-contact sensing mechanism).

In the invention, vibration may be added in performing the "upper face machining". For example, the cutting tool for use in the upper face machining may be used while being vibrated.

In the invention, after the "upper face machining", the surface of a part subjected to the upper face machining may be roughened. That is, the surface undergoing the "upper face machining" sometimes becomes a flat surface, which may not be desirable for formation of the powder layer. In this case, the machined upper surface may be additionally processed into a "rough surface".

Figure 12:
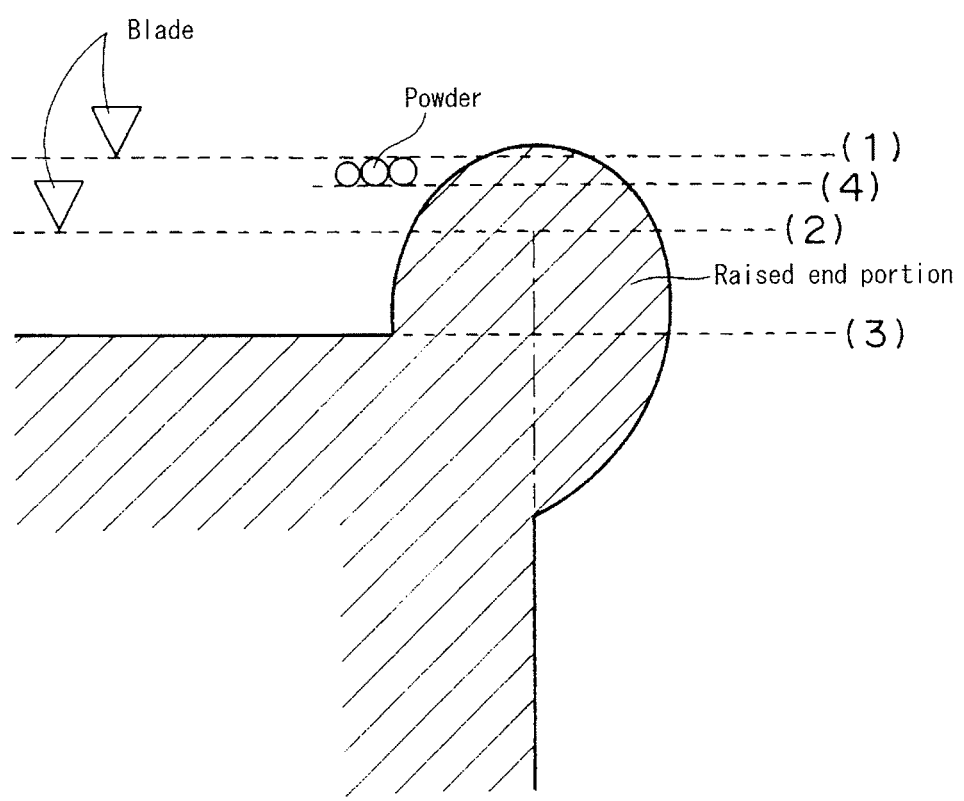
FIG. 12 is a diagram for explaining a cutting height of the "upper face machining".

As to the cutting height in the "upper face machining", for example, the following heights (1) to (4) can be taken (see FIG. 12).

(1) Next Squeezing Height;
(2) Squeezing Height of Sintered Layer;
(3) Height after Sinking (in forming a solidified layer and the powder layer sinks such that its height is decreased.); and (4) Height Lower by a Particle Diameter (maximum particle diameter or mean particle diameter) than the value (1).

In the invention, the process path of the "upper face machining" may be obtained by converting a program for irradiation path of the light beam L into an NC code.

Figure 14:
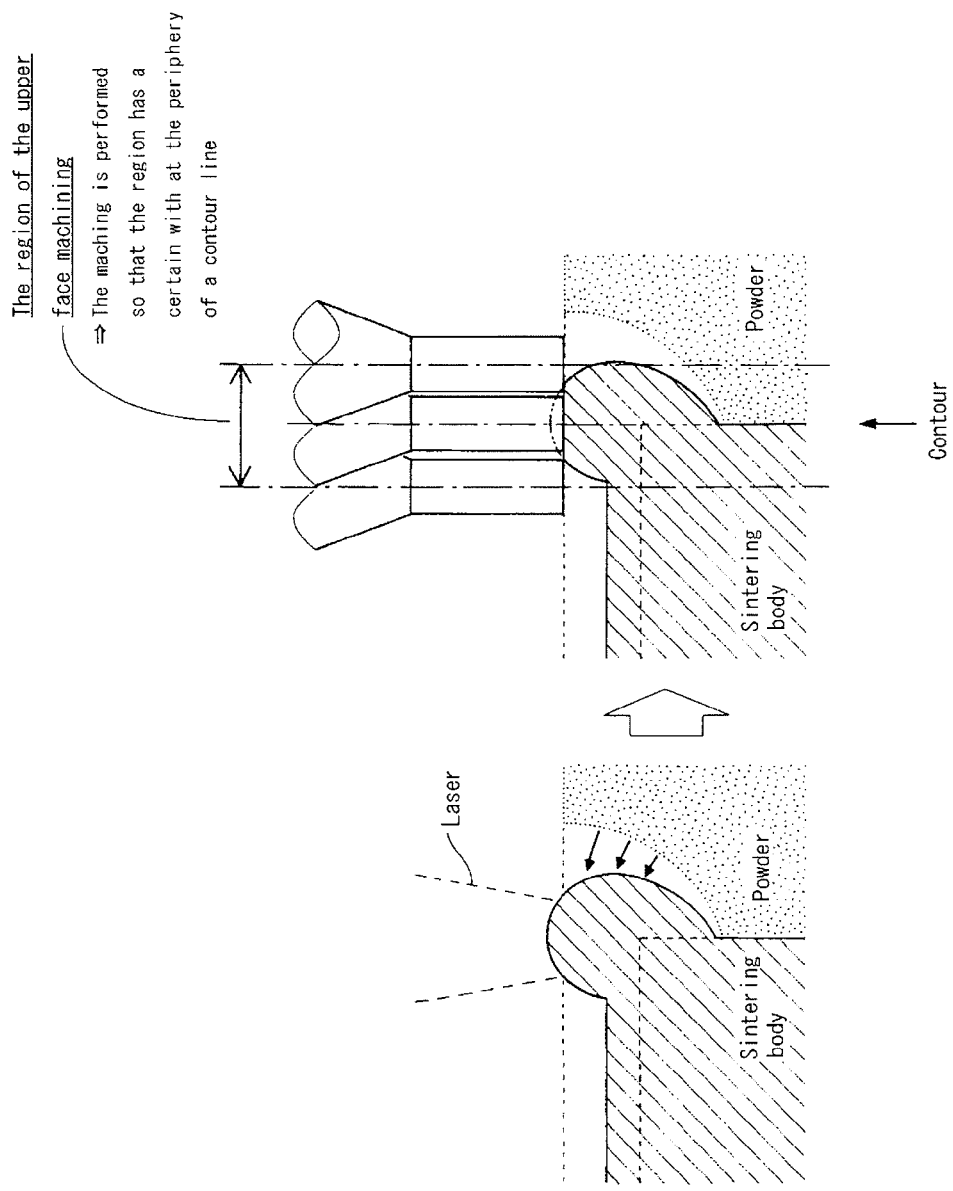
FIG. 14 is a schematic diagram showing the state in which the upper face machining is performed on region having a certain width at the periphery of the contour line.

As shown in FIG. 14, the region of the upper face machining process performed on the peripheral edge may have a certain width at the periphery of the contour line. This is because when the cutting tool is narrower than the width of the "raised solidified portion", the removal effect of the machining cannot be expected (that is, when the cutting tool is narrower than the width of the "raised end", the advantage of the upper face machining can be reduced). An end mill having a large diameter may be used to machine the upper surface of the contour portion only at one time. Alternatively, a small end mill may be moved around a plurality of times in use.

Figure 15:
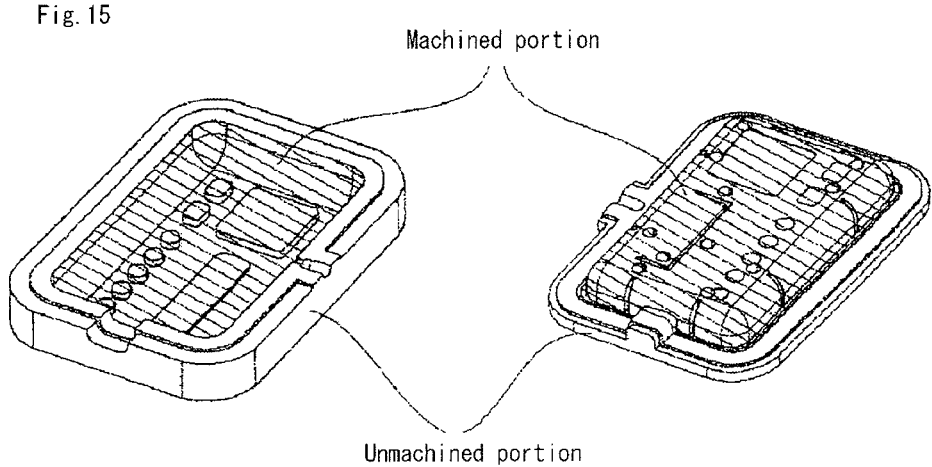
FIG. 15 is a perspective view of a machined portion and an unmachined portion of a shaped object.

The "machining process performed on the outer surface of the shaped object precursor" is not performed on the entire shaped object in some cases. This means that the shaped object can include an unmachined portion. For example, as disclosed in WO2010/150805 A, only a region of a three-dimensional shaped object to which a force is applied in use is subjected to the machining process, while other regions are not subjected to the machining (see FIG. 15). In this case, the "raised solidified portion" cannot be generated in the contour of the unmachined portion, which does not need the upper face machining process. In other words, in the invention, the upper face machining may be performed only on the contour of the portion subjected to the removing and processing process in the machining step. This method exhibits the effect that the process can be completed in a short time.

The disclosed embodiments of the present invention show the typical examples in applications of the invention, but are illustrative only. It is to be easily understood by those skilled in the art that the invention is not limited to those embodiments, and that various modifications and changes can be obtained.

For example, although the above "embodiments of performing the upper side machining by use of the cutting tool" has been mainly described above, the invention is not necessarily limited to these embodiments. The "upper face machining" may be performed by melting or removing the raised end with a laser light.

The "upper face machining" may be performed on the entire undercut portion or contour thereof.

Although substantially different from the technical idea of the invention, a technique disclosed in JP-A-2004-277881 will be described in closing. JP-A-2004-277881 discloses the "manufacturing method of the three-dimensional shaped object" made by the inventors of the present application. In the manufacturing method disclosed, the presence or absence of an abnormal sintered portion is detected. The abnormal sintered portion is one caused by a "spark" generated in sintering with a light beam or "produced cuttings" generated in machining. The abnormal sintered portion is removed upon being detected. That is, the technique of the invention disclosed in JP-A-2004-277881 is dedicated to handling of the abnormal sintered portion caused by the "spark" or "produced cuttings", and includes detection means for detecting the abnormal sintered portion as an essential component. In contrast, the invention of the present application has the following inherent features in the consideration of the fact that the direct application of a laser light to a portion not containing a base material allows powder surrounding the portion to be largely melted, which results in formation of raised part due to its surface tension. Specifically, in the invention, the solidified layer obtained after sintering at least one layer has an upper part of its peripheral edge machined or cut after the machining of the side surface of the shaped object precursor. Therefore, the invention of the present application substantially differs from the invention disclosed in JP-A-2004-277881 in subject of interest, and does not essentially require the detection means (note that the detection means is not essential, which is advantageous in terms of manufacturing time of the three-dimensional shaped object). In this way, the invention of the present application inherently differs from the invention disclosed in JP-A-2004-277881 in technical idea.

INDUSTRIAL APPLICABILITY

According to the method for manufacturing a three-dimensional shaped object of the present invention, various kinds of objects can be provided. For example in a case where the powder layer is a metal powder layer (inorganic powder layer) and thus the solidified layer corresponds to a sintered layer, the three-dimensional shaped object can be used as a metal mold for a plastic injection molding, a press molding, a die casting, a casting or a forging. While on the other hand in a case where powder layer is a resin powder layer (organic powder layer) and thus the solidified layer corresponds to a cured layer, the produced three-dimensional shaped object can be used as a resin molded article.

CROSS REFERENCE TO RELATED PATENT APPLICATION

The present application claims the right of priority of Japanese Patent Application No. 2011-114985 (filed on May 23, 2011, the title of the invention: "METHOD FOR MANUFACTURING THREE-DIMENSIONAL SHAPED OBJECT"), the disclosure of which is incorporated herein by reference.

EXPLANATION OF REFERENCE NUMERALS

1 Laser-sintering/machining hybrid machine
2 Powder layer forming means
3 Light-beam irradiation means
4 Machining means
19 Powder/powder layer (e.g., metal powder/metal powder layer or resin powder/resin powder layer)
20 Forming table (supporting part for shaped object)
21 Base plate (base plate for shaped object)
22 Powder layer (e.g., metal powder layer or resin powder layer)
23 Squeegee blade (squeegee plate)
24 Solidified layer (e.g., sintered layer or cured layer) or three-dimensional shaped object
25 Powder table
26 Wall of storage tank for powder material
27 Wall of forming tank
28 Storage tank for powder material
29 Forming tank
30 Light beam generator
31 Galvanometer mirror
32 Reflective mirror
33 Collective lens
40 Milling head
41 X-Y actuator
41a X-actuator 41a Y-actuator
42 Tool magazine
50 Chamber
52 Window for transmission of light
L Light beam

The invention claimed is:

1. A method for manufacturing a three-dimensional shaped object, the method comprising:
(i) forming a powder layer on a base plate by a sliding movement of a squeegee blade, followed by forming a solidified layer by irradiating a predetermined portion of the powder layer with a light beam, thereby allowing sintering of the powder of the predetermined portion or melting and subsequent solidification thereof; and
(ii) forming another solidified layer by newly forming a powder layer on the solidified layer, and then irradiating another predetermined portion of the new powder layer with the light beam, and repeatedly performing (i) and (ii),
wherein machining is performed at least one time on a side surface of a shaped object precursor obtained during manufacturing the three-dimensional shaped object,
wherein upper face machining of the solidified layer is performed to remove a raised solidified portion generated at a contour region of the solidified layer without first detecting the raised solidified portion, the raised solidified portion being generated due to irradiating both a portion of a powder layer newly overlaid on the solidified layer and a portion of a powder layer that is newly overlaid on another powder layer, the contour region being located at a boundary between an upper face of the solidified layer and a side face of the solidified layer, the upper face being disposed parallel to a surface of the base plate on which the powder layer to be irradiated with the light beam is formed,
wherein, after the machining is performed on the side surface of the shaped object precursor, the light beam is irradiated at a boundary between the portion of the powder layer newly overlaid on the solidified layer and the portion of the powder layer that is newly overlaid on the other powder layer not having the solidified layer underneath as its base to form the raised solidified portion, the boundary between the portions of the powder layers being formed by the machining of the side surface,
wherein the upper face machining is performed on only the contour region of the solidified layer, and
wherein the raised solidified portion is raised above a portion of the power layer that is not irradiated.

2. The method for manufacturing a three-dimensional shaped object according to claim 1, wherein the solidified region for the upper face machining is formed of a plurality of sub-solidified regions,
wherein a machining time A for locally performing the upper face machining only on contour regions of each of the sub-solidified regions of the solidified layer and a machining time B for entirely performing the upper face machining by moving a cutting tool not only to the contour regions of each of the sub-solidified regions of the solidified layer but also to other upper surface regions are determined,
wherein subsequently the upper face machining having the machining time A or B, whichever is shorter, is performed, and
wherein each of the contour regions is located at a boundary between an upper face of the sub-solidified regions and a side face of the sub-solidified regions.

3. The method for manufacturing a three-dimensional shaped object according to claim 1, wherein the upper face machining is performed to remove the raised solidified portion interrupting the sliding movement of the squeegee blade.

4. The method for manufacturing a three-dimensional shaped object according to claim 1, wherein every time one solidified layer is formed after the machining of the side surface of the shaped object precursor, the upper face machining is performed on the raised solidified portion.

* * * * *